United States Patent [19]

Ament

[11] Patent Number: 4,497,298
[45] Date of Patent: Feb. 5, 1985

[54] DIESEL FUEL INJECTION PUMP WITH SOLENOID CONTROLLED LOW-BOUNCE VALVE

[75] Inventor: Frank Ament, Rochester, Mich.

[73] Assignee: General Motors Corporation, Detroit, Mich.

[21] Appl. No.: 587,513

[22] Filed: Mar. 8, 1984

[51] Int. Cl.³ .......................................... F02M 39/00
[52] U.S. Cl. ................... 123/450; 123/458; 123/506; 123/467; 251/368; 251/77; 417/462
[58] Field of Search ............... 123/450, 458, 506, 467; 251/DIG. 4, 129, 138, 368, 77, 141; 417/462, 252, 253

[56] References Cited

U.S. PATENT DOCUMENTS

| | | | |
|---|---|---|---|
| 2,727,715 | 12/1955 | Tuthill | 251/368 |
| 3,166,292 | 1/1965 | Forman | 251/368 |
| 3,598,507 | 8/1971 | Voit | 123/450 |
| 3,842,809 | 10/1974 | King | 123/458 |
| 3,880,131 | 4/1975 | Twaddell | 123/500 |
| 4,313,590 | 2/1982 | Nishimiya | 251/129 |
| 4,314,585 | 2/1982 | Nishimiya | 251/129 |
| 4,344,449 | 8/1982 | Meyer | 251/129 |
| 4,351,283 | 9/1982 | Ament | 123/506 |
| 4,376,447 | 3/1983 | Chumley | 251/141 |
| 4,426,983 | 1/1984 | Seilly | 123/450 |

Primary Examiner—Charles J. Myhre
Assistant Examiner—Carl Stuart Miller
Attorney, Agent, or Firm—Arthur N. Krein

[57] ABSTRACT

A distributor diesel fuel injection pump of the spill-inject-spill type has a two-piece valve moveable relative to a valve seat to the spill-inject-spill cycles with this valve being actuated by the armature of a push type solenoid. At least the tip portion of the valve is made of steel, the remainder of the valve being formed of a compliant material so as to substantially reduce valve bounce and to permit sufficient bending of the valve to allow the armature to contact the pole surface of the solenoid.

3 Claims, 5 Drawing Figures

DIESEL FUEL INJECTION PUMP WITH SOLENOID CONTROLLED LOW-BOUNCE VALVE

This invention relates to diesel fuel injection pumps and, in particular, to such a pump of the spill-inject-spill type having a solenoid actuated low-bounce valve for controlling the spill-inject-spill cycles of operation.

DESCRIPTION OF THE PRIOR ART

A conventional fuel injection pump, of the type disclosed, for example, in U.S. Pat. No. 3,861,833 entitled "Fuel Injection Pump" issued Jan. 21, 1975 to Daniel Salzgerber, Robert Raufeisen and Charles W. Davis, is adapted to deliver metered charges of fuel under high pressure sequentially, by means of a rotary distributor, to the cylinders of an associated engine in timed relationship therewith. In a pump of the above-identified type, a cam ring having inwardly directed cam lobes surrounds one or more pump plungers that are movable relative thereto whereby to translate the contour of the cam lobes into a sequence of pumping strokes producing the high pressure charges of fuel to be delivered to the engine.

In the above-identified type pump, the fuel quantity is mechanically controlled by inlet metering. Normally, a timing advance mechanism is used to adjust the angular position of the cam ring whereby to regulate the timing of injection into the cylinders of the engine as a function of engine speed. A mechanical (flyweight) governor is normally used to control the fuel quantity as a function of pump speed.

As an alternate to the above-described mechanical fuel metering and timing control system, it has been proposed to electronically control the fuel injection in such a fuel injection pump. As disclosed, for example, in U.S. Pat. No. 3,598,507, entitled "Fuel Injection Pump for Multicylinder Internal Combustion Engines", issued Aug. 10, 1971 to Willi Voit and U.S. Pat. No. 3,880,131, entitled "Fuel Injection System for an Internal Combustion Engine", issued Apr. 29, 1975 to Russell W. Twaddell and Edwin B. Watson, the quantity and timing of the fuel to be injected is controlled by means of one or more solenoid valves.

In a pump structure of the type disclosed in the above-identified U.S. Pat. No. 3,880,131, the pump plungers are normally supplied with an excess quantity of fuel, with the pressurized fuel delivered during a pump stroke of the plungers then flowing either to an injection nozzle or through a spill passage as controlled by at least one solenoid valve that is electrically actuated, as by conventional electronic computer, as a function of engine operation whereby to control fuel metering and injection timing. This type pump with solenoid valve controlled fuel injection may be referred to as an electronic controlled spill-inject-spill pump.

The term "spill-inject-spill" is deemed appropriate due to the fact that the solenoid valve or valves are of the normally open type and thus, when the associate solenoid valve is deenergized, and therefore in its open position, pressurized fuel will flow through the valve to a spill passage for return, for example, to the fuel tank of the engine. Injection of fuel will then occur when the associate solenoid valve is energized to its closed position whereby the spill path is closed so that the pressurized fuel will then flow to the associate, in register, fuel injection nozzle. Then when the solenoid valve is again deenergized, injection is terminated and spill flow will again occur until the pump stroke of the plungers is terminated. Alternately, if desired, spill flow can flow to the inlet side of the associate supply pump used to supply fuel to the pump chambers.

It is appreciated in the art that if such a pump, as used in a multicylinder engine, has only a single solenoid actuated valve to control the spill-inject-spill cycles for each of the cylinders of the engine, then a fast-acting, high-force solenoid valve arrangement is required.

Because of fuel economy and emission requirements it is also known that the start and end of the actual injection period must be accurately controlled. However, because of the solenoid's fast response, high needle valve velocities are generated which results in high impact forces. In the case of a typical hardened steel needle valve and valve seat arrangement, these high impact forces result in significant valve bounce upon impact of the tip of the valve against the associate valve seat. This "bounce" appears as an inflection in the fuel calibration curve which limits the ability of the electronic controlled pump to accurately meter fuel, especially to meter small quantities of fuel at high engine speeds.

SUMMARY OF THE INVENTION

The present invention relates to a distributor type diesel fuel injection pump having a solenoid actuated low-bounce needle valve incorporated therein to control the spill-inject-spill cycles of the pump.

It is therefore a primary object of this invention to provide a distributor type fuel injection pump with an improved solenoid actuated valve arrangement to control the spill-inject-spill operating cycles of the pump unit so as to permit more accurate control of fuel injection at all engine speeds.

Another object of this invention is to provide an improved solenoid actuated valve arrangement for an engine driven, distributor fuel injection pump, the solenoid being of the push type acting on a control valve which is in the form of a two piece needle valve composed of at least a steel tip and the remainder being a complient material.

A still further object of this invention is to provide a distributor type fuel injection pump with a solenoid actuated valve whereby the pump is operative as a spill-inject-spill type pump, the valve thereof being constructed in a manner so as to reduce valve bounce.

For a better understanding of the invention as well as other objects and further features thereof, reference is had to the following detailed description of the invention to be read in connection with the accompanying drawings.

DESCRIPTION OF THE PREFERRED EMBODIMENT

Figure 1:
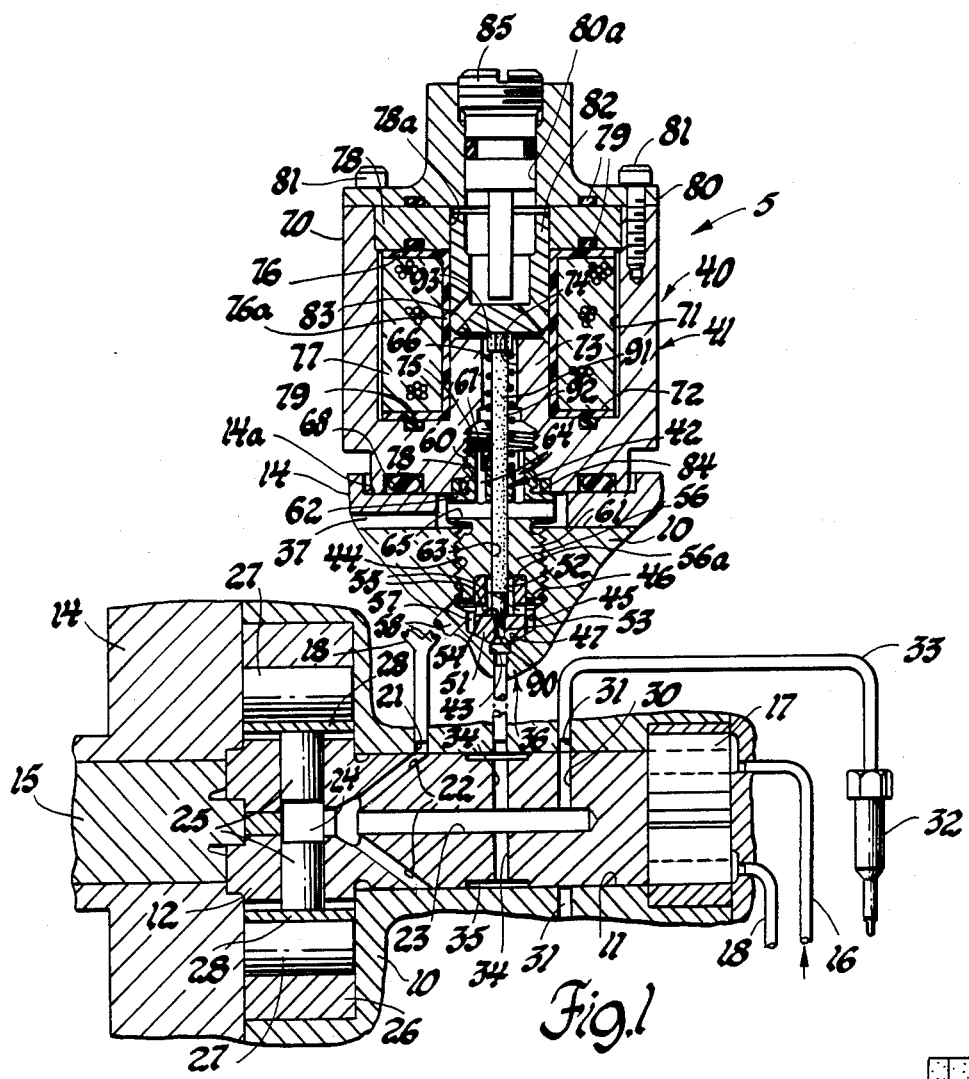
FIG. 1 is a schematic longitudinal cross-sectional view of a spill-inject-spill type engine driven fuel injection pump with a solenoid actuated low-bounce valve, in accordance with one embodiment of the invention, incorporated therein; and, FIGS. 2–5 are views of various embodiments of the low-bounce needle valve, per se, of the pump of FIG. 1.

As schematically shown in FIG. 1, a first embodiment of the subject solenoid actuated low-bounce valve is incorporated into an exemplary engine driven fuel injection pump 5 of a type mechanically similar to that shown in the above-identified U.S. Pat. No. 3,861,833 that is operative to deliver pressurize fuel sequentially to a plurality of injectors associated with the cylinders of an engine, both not shown.

The pump 5 includes a hydraulic head 10 with a cylindrical stepped bore 11 therein in which a distributor rotor 12 is rotatably mounted. Hydraulic head 10 is suitably secured to and within the open end of a drive housing 14 by conventional means, not shown. The drive housing 14 includes a conventional mounting flange, not shown, for attaching the pump to an engine, not shown, whereby the pump drive shaft 15, which is journaled in drive housing 14 and operatively connected to one end of the distributor rotor 12, is driven by the engine in unison therewith.

Fuel from a supply fuel tank, not shown, is delivered via a conduit 16 to the inlet of an engine drive transfer pump, such as the vane-type pump 17 operatively associated with the opposite end of distributor rotor 12. With this arrangement, fuel at a predetermined transfer pressure, as a function of engine speed, is delivered from the outlet of the engine driven transfer pump 17 via a conduit passage 18 to a radial passage 21 in the hydraulic head 10.

Normally, a spring biased pressure regulating valve, not shown, is operatively associated with the passage 18 to control the output from the transfer pump 17 to a predetermined maximum value. Passage 21 is suitably connected, in a known manner, by radial ports 22 in distributor rotor 12 to the axial rotor passage 23 therein, whereby to supply fuel to the pump chamber 24 of the high pressure injection pump portion of the pump unit.

As shown, the high pressure injection pump includes a pair of opposed reciprocating plungers 25, the movements of which are controlled by circumferentially spaced apart, inwardly directed, cam lobes of a cam ring 26. Cam ring 26 is mounted in the circular enlarged diameter portion of bore 11 in the hydraulic head 10.

As is well known, in this type pump, the rotor passage 23 sequentially registers via the radial ports 22 with the passage 21 as the distributor rotor 12 rotates when the pump plungers 25 are free to move radially outward whereby the pump chamber 24 can be supplied with a charge of fuel. Continued rotation of the distributor rotor 12 interrupts the communication between the radial ports 22 and the passage 21 and, then, when the cam follower rollers 27 engage the rise of the cam lobes on cam ring 26 they act through the rotor shoes 28 to force the pump plungers 25 inwardly so as to pressurize the fuel contained in the pump chamber 24 to a high injection pressure.

The thus pressurized fuel in the pump chamber 24 is then delivered by the rotor passage 23 and a radial passage 30 to one of a series of passages 31, only two of which are shown in FIG. 1. The inlet port portions of the passages 31 are suitably positioned in circumferentially spaced apart relationship to each other in the hydraulic head 10 around the distributor rotor 12 for sequential registry with the passage 30, in a known manner, so as to effect the delivery of a charge of fuel from the pump chamber 24 sequentially via conduits 33 to the injection nozzles 32, only one of each being shown. Each injection nozzle is suitably positioned in a known manner so as to discharge fuel into the associated cylinders of an engine, not shown.

In a spill-inject-spill pump of the type shown, the rotor passage 23 is also in flow communication, for example, via radial passages 34 and an annular groove 35 and via a drain passage means, generally designated 36, to a source of low pressure fuel, such as by *being connected to the inlet passage 18 for the pump chamber* 24 *as shown*, or alternatively to the lubricating chamber 37 in the interior of the head 10 or to the fuel tank, not shown, for the engine, with flow through the drain passage means 36 being controlled by a solenoid actuated valve means generally designated 40, to be described in detail hereinafter.

The structure thus far generally described constitutes a solenoid spill-inject-spill type fuel injection pump of the type disclosed in more detail in the above-identified U.S. Pat. No. 3,880,131 with the basic pump structure, per se, being of the type disclosed in greater detail in the above-identified U.S. Pat. No. 3,861,833, the disclosures of which are incorporated herein by reference thereto.

As is well known, the solenoid in this type pump is adapted to be connected by electrical leads, not shown, to an electronic computer, such as an electronic on-board computer, not shown, whereby the solenoid can be actuated as a function of engine operation whereby it is operative to control fuel metering and injection timing.

The solenoid actuated valve means 40, constructed in accordance with the subject invention, includes a solenoid, generally designated 41 and a needle valve 42, which is a two piece valve in accordance with a feature of the invention to be described in detail hereinafter.

Referring first to the drain passage means 36, in the construction shown, it includes a passage 43 defined by the inboard internal wall of a stepped bore extending radially through the wall of the hydraulic head 10. As shown, this bore, starting from its outboard end, defines an internally threaded wall 44, an intermediate wall 45 and the inboard wall defining the passage 43, the latter two walls being of progressively reduced diameters relative to the diameter of wall 44. Walls 44 and 45 are interconnected by an inclined shoulder 46. Walls 45 and 43 are interconnected by an inclined shoulder 47.

Drain passage means 36 is also defined in part by a valve seat member 51 of hardened steel having an stepped axial bore therethrough defining an intermediate wall 52 and a lower wall or orifice passage 53 of a predetermined diameter, with these walls being interconnected by an inclined shoulder defining a valve seat 54. Valve seat member 51 is also provided with radial through ports 55 opening through wall 52.

Valve seat member 51 is adapted to be received in a socket 56a provided for this purpose in the lower end of an adaptor 56 which in turn is threadingly received by the internally threaded wall 44 whereby the lower frustoconical inboard end of valve seat member 51 can be forced into abutment against the shoulder 47 thus effecting substantial coaxial alignment of passages 43 and 53.

The valve seat member 51 defines with the intermediate wall 45 an annulus fuel chamber 57 portion of the drain passage means 36 in flow communication via a last segment of this passage means defined by an inclined passage 58 that is positioned so as to intersect the supply passage 18 in the hydraulic head 10.

As shown, the adaptor 56 is provided with upper and lower externally threaded end portion 60 and 61, respectively, and an intermediate hex shaped flange portion 62 and with an axial valve guide bore 63 extending therethrough. In addition, the upper end portion 60 of the adaptor 56 is provided with one or more axial extending vent passages 64 that are of an axial extend such as to intersect at least one transverse passage 65 extending through the flange portion 62 so as to intersect bore 63.

A spring 66, used to normally bias the valve 42 to an open position with respect to valve seat 54, has one end thereof in abutment against the upper annular shoulder 67 surrounding the bore 63 in the adaptor 56.

Solenoid valve 41, in the construction shown, includes a cup-shaped solenoid body 70 of silicon core iron with a blind bore extending from its upper end to define an internal wall 71 intersecting a base wall 72 having a central boss-like pole piece 73 upstanding therefrom. A stepped axial bore extends through the boss 73 and the lower or base portion of the body 70 to define an upper valve guide wall 74 and a lower internally threaded wall 75 for threaded engagement with the upper end portion 60 of the adaptor 56. In the construction shown, an O-ring seal 68 is used to effect a seal between the lower surface of the solenoid body 70 and the drive housing 14 which has a radial aperture 14a therethrough to loosely receive the solenoid actuated valve assembly.

A bobbin 76, carrying a wound solenoid coil 77 is received within the internal wall 71, with the bore wall 76a of the bobbin 76 encircling the boss 73. Bobbin 76 is axially fixed within the body 70 in one direction by having its lower end in abutment against the base wall 72 and in the opposite direction by means of a spacer ring 78 that is sandwiched between the upper end of the bobbin 76 and a cover plate 80 suitably fixed as by screws 81 to the upper end surface of the body 70. Suitable seals, such as O-ring seals 79 positioned in annular grooves provided for this purpose are used to effect sealing between the cover plate 80 and the spacer ring 78, between this ring and the upper end of the bobbin 76, and between the lower end of bobbin 76 and the base wall 72 of the solenoid body 70.

An apertured, cup-shaped armature 82 is slidably received in the bore wall 76a of bobbin 76 and the central aperture 78a in spacer ring 78 for axial movement relative to the upper pole face 83 of the pole piece 73 whereby to control opening and closing movement of the valve 42. That is, with the solenoid coil 77 deenergized, the valve spring 66 is operative to move the valve 42 and the armature 82 in a valve opening direction and, when the solenoid coil 77 is energized, the armature 82 will move toward the pole face 83 of pole piece to force the valve 42, against the bias of the valve spring 66 in a closing direction to effect its sealing engagement with the valve seat 54.

The movement of the armature 82 in an axial upward direction with reference to FIG. 1 is adjustably fixed as by means of an armature adjusting screw 85 threadingly and sealingly received in the stepped bore 80a in the cover plate 80.

The needle valve 42, in the construction shown, includes a valve tip 90 with a stepped stem 91 extending therefrom that includes a shank portion 92 and a free end flutted valve guide 93 portion of an external diameter greater than shank portion 92 and sized so as to be loosely received by the valve guide wall 74 in the solenoid body 70. As shown in FIG. 1, the shank portion 92 of the needle valve 42 is axially guided by the guide bore 63 in the adaptor 56.

The operative axial extent of the valve 42 is preselected relative to the axial extent between valve seat 54 and the pole face 83 so that the upper surface of the valve guide 93 extends above the pole face 83 a predetermined distance when the valve 42 is in seated engagement with the valve seat 54 whereby the armature 82 is always in engagement with the valve 42 during opening and closing movement thereof. In the embodiment shown, a spacer ring 84 is used to fix the axial extent, as required, between the valve seat 54 and pole face 83, the spacer ring 84 being positioned so as to loosely encircle the upper end portion 60 of the adaptor 56 whereby it is sandwiched between the upper surface of the flange portion 62 of the adaptor and the lower countersunk wall of the solenoid body 70.

Now in accordance with a feature of the invention, the needle valve 42 is of two piece construction with at least the seating surface or valve tip 90 end thereof being of hardened steel and the remainder of the valve being made of a suitable compliant material having an Elastic Modulus about 50 to 120 times lower than that of the steel of the valve tip.

One class of suitable compliant materials are the various polyimide resins, such as for example, those marketed as follows: Vespel SP-21; Torlon 4301; Torlon 4203; and Tribolon.

The product Vespel SP-21, is a polyimide resin with a filler of graphite up to 15% by weight sold under the trademark VESPEL of E. I. DuPont De Nemours & Co. for a high aromatic polymer of poly -N, N' (P, P'-oxydiphenylene) pyromellitimide having the general formula $[(C_{22}H_{10}O_5N_2)]$. Vespel SP-21 has an Elastic Modulus E of 200,000 to 700,000 psi.

The products Torlon 4301 or Torlon 4203 are polyamide-imide resins sold under the trademark TORLON of the Amoco Chemicals Corporation for poly (amide-imide) resins while Tribolon is a polyimide resin sold by Fluorocarbon.

Figure 2:
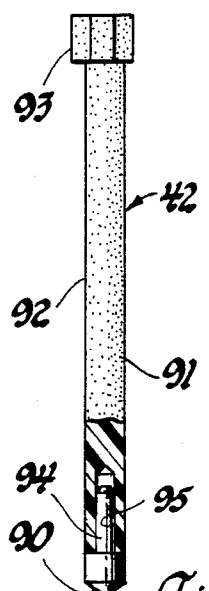
Figure 3:
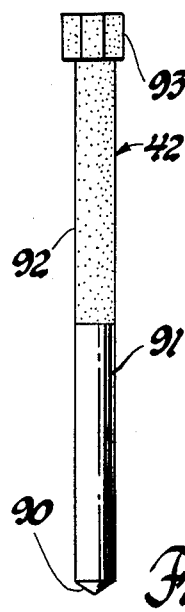
Figure 4:
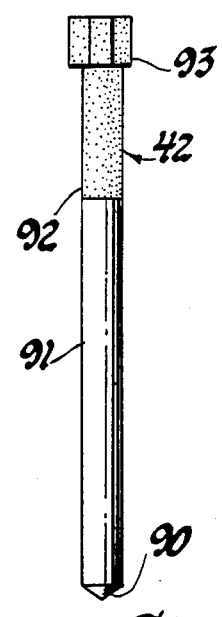
Figure 5:
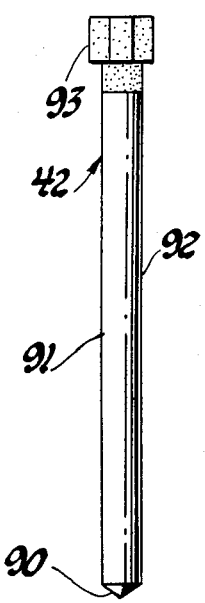

Various embodiments of a needle valve 42 are illustrated in FIGS. 2–5, with the proportions of steel and compliant material varying as follows:

FIG. 2: About 5% steel, the rest or about 95% compliant material;

FIG. 3: About 50% steel, the rest or about 50% compliant material;

FIG. 4: About 75% steel, the rest or about 25% compliant material; and,

FIG. 5: About 95% steel, the rest or about 5% compliant material.

The above percentages relate to the axial length portions of the valve 42 that are either made of steel or of the compliant material. In each of the embodiments shown, the valve tip 90, including an attachment pin 94, and part of the shank portion 92 is made of steel, while the fluted valve guide 93 and the remaining portion of the shank portion 92 is made of a compliant material. As shown the free end of the compliant material shank portion 92 is provided with a blind bore 95 of a suitable size so as to receive the attachment pin 94 as by a press fit, as shown in FIG. 2.

Forming the needle valve 42 as a two piece structure, one of which is of compliant material, increases the resiliency of the needle valve. That is, in operation as the needle valve is moved into engagement with the valve seat 54, the compliant portion thereof will then deflect or bend so as to prevent valve bounce and at the same time it decelerates the downward movement, with reference to FIG. 1, of the armature 82 to allow it to engage the pole face 83. It has been observed during testing, that when the armature 82 contacts the pole face 83, no bounce of either the armature 82 or valve 42 occurred.

What appears to occur, is that upon energization of the solenoid coil 77, the armature 82 is attracted by a strong magnetic field toward the pole face 83, thus moving the needle valve 42 downward with the valve tip 90 thereof then engaging the valve seat 54. However, because of the attractive force still being applied to the armature 82, its downward movement still continues without interruption, thus forcing the compliant portion of the needle valve 42 to deflect or bend sufficiently so as to allow the armature 82 to then contact the pole face 83, i.e., zero air gap. Thereafter, because of the memory of the compliant material portion of the needle valve 42, this compliant portion of the valve will straighten out so as to return to its normal axial length thereby at the same time forcing the armature 82 upward until the prior set normal minimum air gap between the opposed working surfaces of the armature and pole face is established.

As an example, in a particular fuel injection pump embodiment as used on various six cylinder engines, the axial extent of the needle valve 42 relative to the axial extent between the valve seat 54 and pole face 83 was selected so that the upper face of the valve guide 93 of valve 42 extended 0.004 inch above the pole face 83, thus providing a normal minimum air gap of 0.004 inch between the opposed working surfaces of the armature 82 and pole face 83. The axial extent between the pole face 83 and the bottom surface of the adjusting screw 85 relative to the axial extent of the armature 82 was selected to permit opening upward movement of the valve 42 and specifically the valve tip 90 thereof to travel 0.012 inch, thus in effect defining a working air gap of 0.016 inch between opposed working surfaces of the armature 82 and pole face 83, when the needle valve 42 is in its full open position.

During operation, with these dimensions, as the solenoid coil 77 is energized, the valve tip 90 of the needle valve 42 would travel 0.012 inch so as to sealingly engage the valve seat 54, but the valve guide 93 portion thereof and the armature 82 would initially travel 0.016 inch so that the armature 82 engaged the pole face 83 and then, both of these elements would retract back upward from the pole face 83 until a 0.004 inch air gap existed between the opposed working surface of the armature 82 and pole face 83.

In this particular application, the tip and shank 92 portions of the needle valve 42 had an outside diameter of approximately 2.5 mm and an axial length of approximately 35.7 mm and the internal diameter of the orifice passage was approximately 1.90 mm. The injection pump was used on both indirect injection and direct injection type six cylinder engines so that maximum pump pressures were on the order of 5,000 to 8,000 psi, respectively with little or no valve bounce during needle valve 42 closure using the various needle valve embodiments shown in FIGS. 2 to 5.

In view of the above, it should be apparent to those skilled in the art that both the elastic modulus of the compliant material and the amount of compliant material used in a particular two-piece needle valve application can be varied as necessary so as to assure that the impact deflection of the valve is equal to or slightly greater than the normal minimum air gap so that the armature 82 can contact the pole face 83, so as to initially obtain a zero air gap.

While the invention has been described with reference to the structure disclosed herein, it is not confined to the specific details set forth, since it is apparent that many modifications and changes can be made by those skilled in the art. This application is therefore intended to cover such modifications or changes as may come within the purposes of the improvements or scope of the following claims.

The embodiments of the invention in which an exclusive property or privilege is claimed are defined as follows:

1. In an engine driven, solenoid valve controlled, spill-inject-spill type fuel injection pump having a housing means with an injection pump means therein for sequentially supplying pressurized fuel via a discharge passage means to a plurality of injectors, a supply pump means for supplying fuel via an inlet passage means to the injection pump means, a spill passage means in the housing means in communication at one end with the discharge passage means and at its other end with the inlet passage means and having a solenoid actuated valve including an armature and needle valve operatively associated therewith for controlling the spill-inject-spill flow from the discharge passage means, the improvement wherein said needle valve is a two-piece valve and includes a needle valve tip with a stem extending therefrom, at least the needle valve tip and a portion of said stem being of steel, the remainder of said stem being of a compliant material having an elastic modulus in the range of from 50 to 120 times lower than the elastic modulus of said steel.

2. In an engine driven, solenoid valve controlled spill-inject-spill type fuel injection pump having a housing means with an injection pump means therein for sequentially supplying pressurized fuel via a discharge passage means to a plurality of injectors, a supply pump means for supplying fuel via an inlet passage means to the injection pump means, a spill passage means including an orifice passage encircled by a valve seat in the housing means in communication at one end with the discharge passage means and at its other end with the inlet passage means and having a solenoid actuated valve including an armature and needle valve operatively associated therewith for controlling the spill-inject-spill flow from the discharge passage means, the improvement wherein solenoid has a push-type armature associated with an opposed face of a pole piece and wherein said needle valve is a two-piece valve that includes a needle valve tip with a stem extending therefrom, at least the needle valve tip and a portion of said stem being of steel, the remainder of said stem being of a compliant material having an elastic modulus in the range of from 50 to 120 times lower than the elastic modulus of said steel, whereby upon energization of the solenoid, as the valve tip engages the valve seat, bending of the compliant material will allow continued movement of the armature to contact the face of the pole piece, thereby substantially eliminating valve bounce.

3. In an engine driven, solenoid valve controlled spill-inject-spill type fuel injection pump according to claim 1 or 2 wherein 5% to 95% of said stem is of said compliant material.

* * * * *